United States Patent
Li et al.

(10) Patent No.: US 9,722,924 B2
(45) Date of Patent: Aug. 1, 2017

(54) TOPOLOGY STRATIFICATION METHOD AND APPARATUS, AND FLOODING PROCESSING METHOD AND APPARATUS

(71) Applicant: Huawei Technologies Co., Ltd., Shenzhen (CN)

(72) Inventors: Jianfei Li, Beijing (CN); Rong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 14/661,374

(22) Filed: Mar. 18, 2015

(65) Prior Publication Data

US 2015/0195201 A1    Jul. 9, 2015

Related U.S. Application Data

(63) Continuation of application No. PCT/CN2013/073481, filed on Mar. 29, 2013.

(30) Foreign Application Priority Data

Nov. 8, 2012   (CN) .......................... 2012 1 0444069

(51) Int. Cl.
*H04L 12/70*   (2013.01)
*H04L 12/741*   (2013.01)
(Continued)

(52) U.S. Cl.
CPC .......... *H04L 45/745* (2013.01); *H04L 45/02* (2013.01); *H04L 45/32* (2013.01); *H04L 45/48* (2013.01);
(Continued)

(58) Field of Classification Search
CPC ......... H04L 45/02; H04L 45/32; H04L 45/48; H04L 45/745; H04L 61/103; H04L 61/2015; H04L 61/6022
See application file for complete search history.

(56) References Cited

U.S. PATENT DOCUMENTS 9,036,638 B2 *   5/2015   Banavalikar .......... H04L 49/351
                                                                370/389
9,166,911 B2 *   10/2015  Schlansker .......... H04L 12/413
(Continued)

FOREIGN PATENT DOCUMENTS

CN           1479495 A        3/2004
CN           101188510 A      5/2008
(Continued)

OTHER PUBLICATIONS

"OpenFlow Switch Specification," Version 1.3.1 (Wire Protocol 0x04), Open Networking Foundation, Sep. 6, 2015 128 pages.
(Continued)

*Primary Examiner* — Ahmed Elallam
(74) *Attorney, Agent, or Firm* — Conley Rose, P.C.

(57) ABSTRACT

The method includes the following steps. First, a controller receives a data packet that is reported by a switch connected to a source host; then the controller searches a local media access control (MAC) address table of physical addresses of devices to determine whether a destination address of the data packet exists, and the controller acquires a destination port if no destination address of the data packet exists, where the destination port is a port of a switch connected to a destination host, and the destination host is another host different from the source host; and finally, the controller uses the destination port as a destination address to generate a routing table, and sends the routing table to the switch connected to the source host, so that the switch connected to (Continued)

the source host forwards the data packet according to the routing table.

8 Claims, 8 Drawing Sheets

(51) Int. Cl.
*H04L 12/721* (2013.01)
*H04L 12/751* (2013.01)
*H04L 29/12* (2006.01)
*H04L 12/753* (2013.01)

(52) U.S. Cl.
CPC ........ *H04L 61/103* (2013.01); *H04L 61/2015* (2013.01); *H04L 61/6022* (2013.01)

(56) References Cited

U.S. PATENT DOCUMENTS

| | | | |
|---|---|---|---|
| 9,461,943 B2* | 10/2016 | Narasimhan | H04L 41/0813 |
| 2010/0316053 A1 | 12/2010 | Miyoshi et al. | |
| 2011/0007741 A1* | 1/2011 | Kreeger | H04L 45/48 |
| | | | 370/389 |
| 2011/0080855 A1 | 4/2011 | Fung | |
| 2011/0270979 A1 | 11/2011 | Schlansker et al. | |
| 2011/0299537 A1* | 12/2011 | Saraiya | H04L 61/2596 |
| | | | 370/392 |
| 2012/0033668 A1 | 2/2012 | Humphries | |
| 2012/0120964 A1 | 5/2012 | Koponen et al. | |
| 2012/0147898 A1* | 6/2012 | Koponen | H04L 41/0893 |
| | | | 370/422 |
| 2015/0156107 A1* | 6/2015 | Li | H04L 45/18 |
| | | | 370/230 |

FOREIGN PATENT DOCUMENTS

| | | |
|---|---|---|
| CN | 101217492 A | 7/2008 |
| CN | 102143007 A | 8/2011 |
| CN | 102273141 A | 12/2011 |
| CN | 102420775 A | 4/2012 |
| CN | 102647715 A | 8/2012 |
| WO | 2008024882 A2 | 2/2008 |
| WO | 2010080163 A1 | 7/2010 |

OTHER PUBLICATIONS

Foreign Communication From A Counterpart Application, European Application No. 13852964.9, Partial Supplementary European Search Report dated Aug. 4, 2015, 7 pages.
Foreign Communication From A Counterpart Application, European Application No. 13852964.9, Extended European Search Report dated Dec. 3, 2015, 16 pages.
Foreign Communication From A Counterpart Application, Chinese Application No. 201210444069.4, Chinese Office Action dated Jul. 20, 2016, 5 pages.
Partial English Translation and Abstract of Chinese Patent Application No. CN101217492A, Mar. 13, 2015, 6 pages.
Partial English Translation and Abstract of Chinese Patent Application No. CN1479495A, May 13, 2015, 3 pages.
Kim, C., et al., "Floodless in SEATTLE: A Scalable Ethernet Architecture for Large Enterprises," ACM Transactions on Computer Systems, vol. 29, No. 1, Feb. 2011, 14 pages.
Foreign Communication From A Counterpart Application, PCT Application No. PCT/CN2013/073481, English Translation of International Search Report dated Aug. 8, 2013, 3 pages.
Foreign Communication From A Counterpart Application, PCT Application No. PCT/CN2013/073481, English Translation of Written Opinion Report dated Aug. 8, 2013, 11 pages.

* cited by examiner

TOPOLOGY STRATIFICATION METHOD AND APPARATUS, AND FLOODING PROCESSING METHOD AND APPARATUS

CROSS-REFERENCE TO RELATED APPLICATIONS

This application is a continuation of International Application No. PCT/CN2013/073481, filed on Mar. 29, 2013, which claims priority to Chinese Patent Application No. 201210444069.4, filed on Nov. 8, 2012, both of which are hereby incorporated by reference in their entireties.

TECHNICAL FIELD

The present invention relates to the field of communications systems, and in particular, to a topology stratification method and apparatus, and a flooding processing method and apparatus.

BACKGROUND

On a conventional computer network, each switch is capable of acquiring only information about an adjacent switch, and a global network view is not available for each switch. A network based on a software defined network (SDN) technology is an important trend of future network development. A core idea of an SDN is separating a control plane of a network device from a data forwarding plane of the network device. A switch performs forwarding strictly based on a forwarding table; the switch provides an interface (e.g., an application programming interface (API)) for a controller to control; and the switch and the controller follow a certain protocol.

On an SDN network, a routing table is empty during initialization of a switch. When no matched routing table is found in the switch for a received data packet, the received data packet is reported to a controller to request a forwarding policy. For the data packet reported by the switch, the controller selects a route for the switch and delivers a corresponding routing table to the switch if a destination address is found in a local media access control (MAC) table of physical addresses of devices. If no destination address of the reported data packet is found in the local MAC table, the controller instructs the switch to flood the data packet to ports of all other switches except for a receiving port on a local network. However, the data packet may be repeatedly broadcast on the network, causing a broadcast storm.

SUMMARY

Embodiments of the present invention provide a topology stratification method and apparatus, and a flooding processing method and apparatus, which may stratify and differentiate switches on a network, thereby efficiently restraining flooding, eliminating repeated broadcasting of a data packet on the network, and improving link utilization.

The embodiments of the present invention adopt the following technical solutions.

A topology stratification method includes acquiring, by a controller according to topology information of a switch on a network, a switch connected to a host; configuring, by the controller, the switch connected to the host as a layer 1 switch; and acquiring, by the controller, unstratified switches on the network, and configuring a switch directly connected to a layer N switch among the unstratified switches as a layer N+1 switch, where N indicates a layer on which the switch is located, and N is a positive integer.

The acquiring, by a controller according to topology information of a switch on a network, a switch connected to a host includes acquiring, by the controller, enabled ports of the switch according to the topology information of the switch on the network; determining, by the controller, whether a port connected to the host exists among the enabled ports of the switch; and if a port connected to the host exists among the enabled ports of the switch, confirming, by the controller, that the switch is the switch connected to the host.

After the acquiring, by the controller, unstratified switches on the network, and configuring a switch directly connected to a layer N switch among the unstratified switches as a layer N+1 switch, the method further includes, when the controller receives a data packet that is reported by a switch connected to a source host, searching, by the controller, a local MAC address table of physical addresses of devices to determine whether a destination address of the data packet exists; acquiring, by the controller, a destination port if no destination address of the data packet exists, where the destination port is a port of a switch connected to a destination host, and the destination host is another host different from the source host; and using, by the controller, the destination port as a destination address to generate a routing table, and sending the routing table to the switch connected to the source host, so that the switch connected to the source host forwards the data packet according to the routing table.

The acquiring, by the controller, a destination port if no destination address of the data packet exists includes acquiring, by the controller according to topology stratification, a port among enabled ports of the switch connected to the destination host and using the port as the destination port, where the port is not connected to another switch.

A flooding processing method includes receiving, by a controller, a data packet that is reported by a switch connected to a source host; searching, by the controller, a local MAC address table of physical addresses of devices to determine whether a destination address of the data packet exists; acquiring, by the controller, a destination port if no destination address of the data packet exists, where the destination port is a port of a switch connected to a destination host, and the destination host is another host different from the source host; and using, by the controller, the destination port as a destination address to generate a routing table, and sending the routing table to the switch connected to the source host, so that the switch connected to the source host forwards the data packet according to the routing table.

The acquiring, by the controller, a destination port if no destination address of the data packet exists includes performing, by the controller, topology stratification on switches on a network; acquiring, by the controller according to the topology stratification, a port among enabled ports of the switch connected to the destination host and using the port as the destination port, where the port is not connected to another switch.

The data packet is an Address Resolution Protocol (ARP) request and/or an unknown unicast frame and/or Dynamic Host Configuration Protocol (DHCP) data.

When the data packet is an ARP request, after the acquiring, by the controller, a destination port if no destination address of the data packet exists, the method further includes selecting, by the controller, a port to which a host is connected having unknown information from the destination ports and using the port to which a host is connected having unknown information as the destination address.

When the data packet is an ARP request, before the acquiring, by the controller, a destination port if no destination address of the data packet exists, the method further includes, if a destination address of the ARP request exists in the local MAC address table, directly responding to, by the controller, the ARP request sent by the source host.

A topology stratification apparatus includes a first acquiring unit adapted to acquire, according to topology information of a switch on a network, a switch connected to a host; a configuration unit adapted to configure the switch connected to the host and acquired by the first acquiring unit as a layer 1 switch; where the first acquiring unit is further adapted to acquire unstratified switches on the network; and the configuration unit is further adapted to configure a switch directly connected to a layer N switch among the unstratified switches that are acquired by the first acquiring unit as a layer N+1 switch, where N indicates a layer on which the switch is located, and N is a positive integer.

The acquiring unit includes an acquiring module adapted to acquire enabled ports of the switch according to the topology information of the switch on the network; a determining module adapted to determine whether a port connected to the host exists among the enabled ports of the switch, where the enabled ports of the switch are acquired by the acquiring module; and a confirming module adapted to, if the determining module determines that a port connected to the host exists among the enabled ports of the switch, confirm that the switch is the switch connected to the host.

The apparatus further includes a searching unit adapted to, when a data packet that is reported by a switch connected to a source host is received, search a local MAC address table of physical addresses of devices to determine whether a destination address of the data packet exists; a second acquiring unit adapted to acquire a destination port if the searching unit determines through searching that no destination address of the data packet exists, where the destination port is a port of a switch connected to a destination host, and the destination host is another host different from the source host; and a generating unit adapted to use the destination port acquired by the second acquiring unit as a destination address to generate a routing table, and send the routing table to the switch connected to the source host, so that the switch connected to the source host forwards the data packet according to the routing table.

The second acquiring unit is specifically adapted to acquire, according to topology stratification, a port among enabled ports of the switch connected to the destination host and use the port as the destination port, where the port is not connected to another switch.

A flooding processing apparatus includes a receiving unit adapted to receive a data packet that is reported by a switch connected to a source host; a searching unit adapted to search a local MAC address table of physical addresses of devices to determine whether a destination address of the data packet received by the receiving unit exists; an acquiring unit adapted to acquire a destination port if the searching unit determines through searching that no destination address of the data packet exists in the MAC table, where the destination port is a port of a switch connected to a destination host, and the destination host is another host different from the source host; and a sending unit adapted to use the destination port acquired by the acquiring unit as a destination address to generate a routing table, and send the routing table to the switch connected to the source host and a switch that needs to forward the data packet, so that the switch connected to the source host and the switch that needs to forward the data packet according to the routing table.

The acquiring unit includes a stratification module adapted to perform topology stratification on switches on a network; and an acquiring module adapted to acquire, according to the topology stratification performed by the stratification module, a port among enabled ports of the switch connected to the destination host and use the port as the destination port, where the port is not connected to another switch.

The data packet is an ARP request and/or an unknown unicast frame and/or DHCP data.

The apparatus further includes a selecting unit adapted to select a port to which a host is connected having unknown information from the destination ports acquired by the acquiring unit and use the port to which a host is connected having unknown information as the destination address; and a responding unit adapted to, if a destination address of the ARP request exists in the local MAC address table, directly respond to the ARP request that is sent by the source host and received by the receiving unit.

The embodiments of the present invention provide a topology stratification method and apparatus, and a flooding processing method and apparatus. First, a controller receives a data packet that is reported by a switch connected to a source host; then the controller searches a local MAC address table of physical addresses of devices to determine whether a destination address of the data packet exists, and the controller acquires a destination port if no destination address of the data packet exists, where the destination port is a port of a switch connected to a destination host, and the destination host is another host different from the source host; finally, the controller uses the destination port as a destination address to generate a routing table, and sends the routing table to the switch connected to the source host, so that the switch connected to the source host forwards the data packet according to the routing table. On an SDN network, if no destination address of a data packet reported by a switch is found in the local MAC table, the controller generally instructs the switch to flood the data packet to ports of all other switches except for a receiving port on a local network. However, the data packet may be repeatedly broadcast on the network, causing a broadcast storm. In the embodiments of the present invention, a controller performs topology stratification on switches on a network, and configures a routing table for a switch when no destination address of a data packet reported by the switch can be found in a local MAC address table. In this way, the switch forwards the data packet only to a port of a switch connected to a destination host that is acquired by the controller according to the topology stratification, thereby efficiently restraining flooding, eliminating repeated broadcasting of the data packet on the network, and improving link utilization.

BRIEF DESCRIPTION OF THE DRAWINGS

To illustrate the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and the embodiments.

Figure 1:
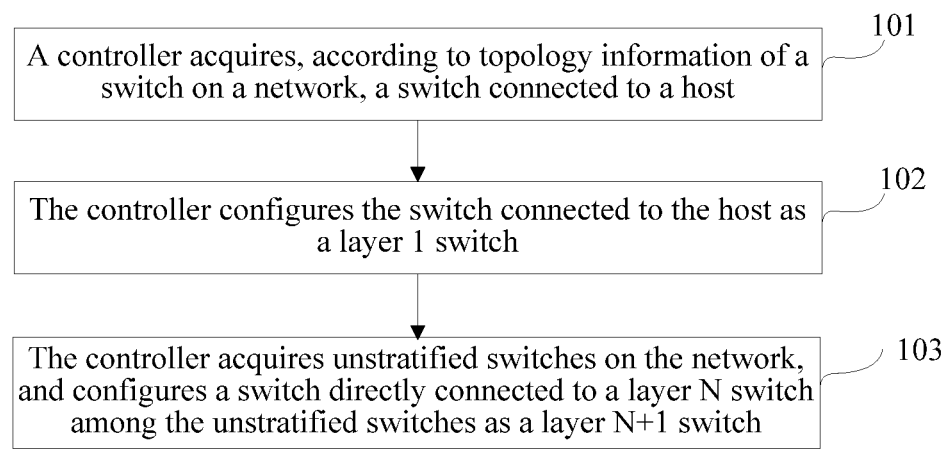
FIG. 1 is a flowchart of a topology stratification method according to an embodiment of the present invention.

An embodiment provides a topology stratification method. As shown in FIG. 1, the method includes the following steps.

101. A controller acquires, according to topology information of a switch on a network, a switch connected to a host.

Specifically, the controller acquires enabled ports of the switch according to the topology information of the switch on the network; the controller determines whether a port connected to the host exists among the enabled ports of the switch; and if a port connected to the host exists among the enabled ports of the switch, the controller confirms that the switch is the switch connected to the host.

Figure 8:
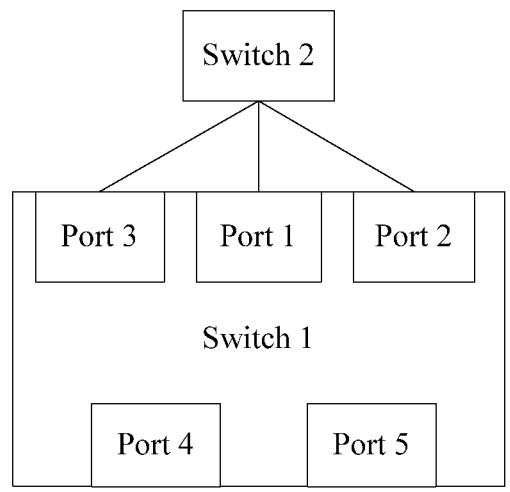
FIG. 8 is a schematic diagram of a status of a port of a switch according to an embodiment of the present invention.

For example, in FIG. 8, the enabled ports of the switch include ports: Port 1, Port 2, Port 3, Port 4, and Port 5, where Port 1, Port 2, and Port 3 connect to another switch. In this case, the controller may determine that Port 4 and Port 5 of the switch are ports connected to the host.

102. The controller configures the switch connected to the host as a layer 1 switch.

103. The controller acquires unstratified switches on the network, and configures a switch directly connected to a layer N switch among the unstratified switches as a layer N+1 switch.

N indicates a layer on which the switch is located, and N is a positive integer.

Specifically, the controller configures a switch with a port connected to the host as a layer 1 switch. Likewise, the controller configures a switch directly connected to the layer 1 switch among the unstratified switches as a layer 2 switch; therefore, by analog, a switch directly connected to a layer N−1 switch among the unstratified switches is the layer N switch. According to this rule, all switches on the network can be classified.

For the topology stratification method provided in this embodiment, a specific data structure may be as follows: <key, value>=(layer i, value), i=1, 2, . . . , N. In this case, the layer 1 switch is stored as: Key=layer1; Value=<Sw ID, Ports to hosts, last seen Time>; the layer 2 switch directly connected to the layer 1 switch is stored as: Key=layer2; Value=<Sw ID, Links to layer1, last seen Time>. The layer N switch connected to the layer (N−1) switch is stored as: Key=layer N; Value=<SwID, Links to layer(N−1), last seen Time>. By analog, the classification continues until all switches are classified. When addition/deletion of a host and/or addition/deletion of a switch and/or addition/deletion of a link on the network causes a change to a location of a switch, a data structure of the layer 1 switch is updated, and a location of another switch connected to the switch is updated, and so on, until all switches are updated.

Further, after step 103, the method may further include the following. When the controller receives the data packet that is reported by the switch connected to the source host, the controller searches a local MAC address table of physical addresses of devices to determine whether a destination address of the data packet exists; the controller acquires a destination port according to topology stratification if no destination address of the data packet exists, where the destination port is a port of a switch connected to a destination host, and the destination host is another host different from the source host; and the controller uses the destination port as a destination address to generate a routing table, and sends the routing table to the switch connected to the source host, so that the switch connected to the source host forwards the data packet according to the routing table.

Figure 6:
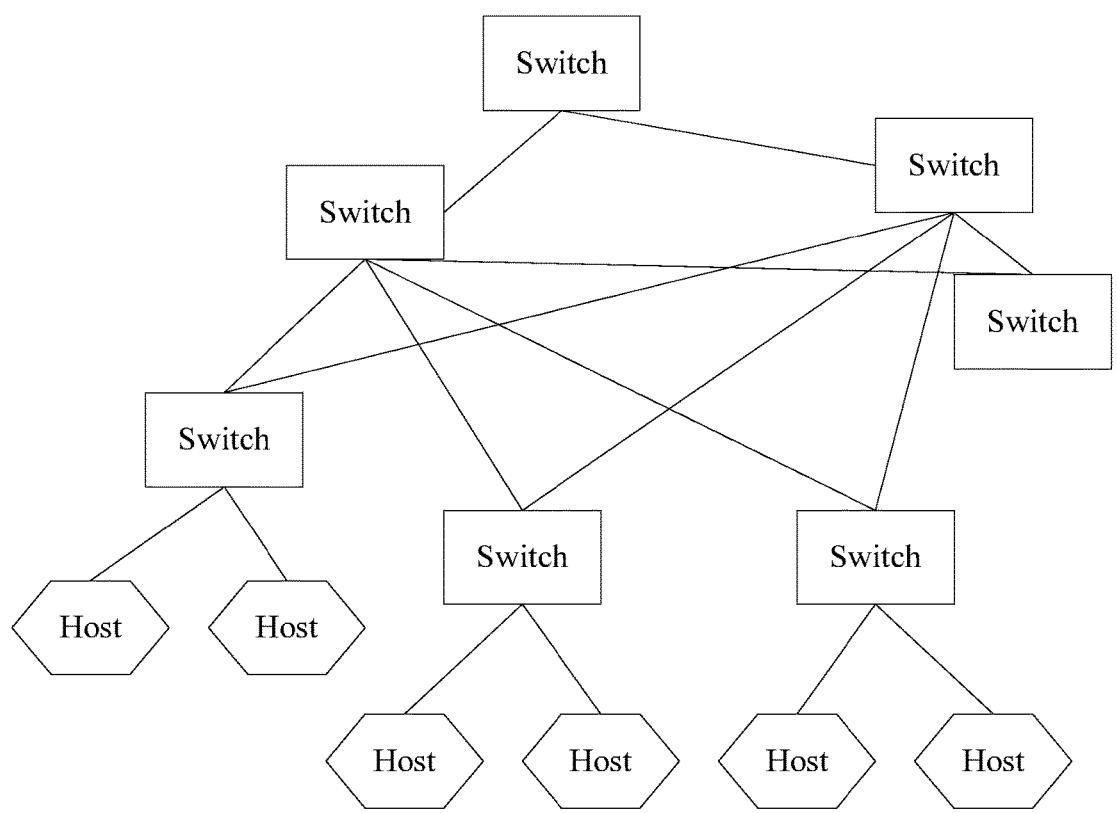
FIG. 6 illustrates a topology structure of switches on an existing network according to the prior art.
Figure 7:
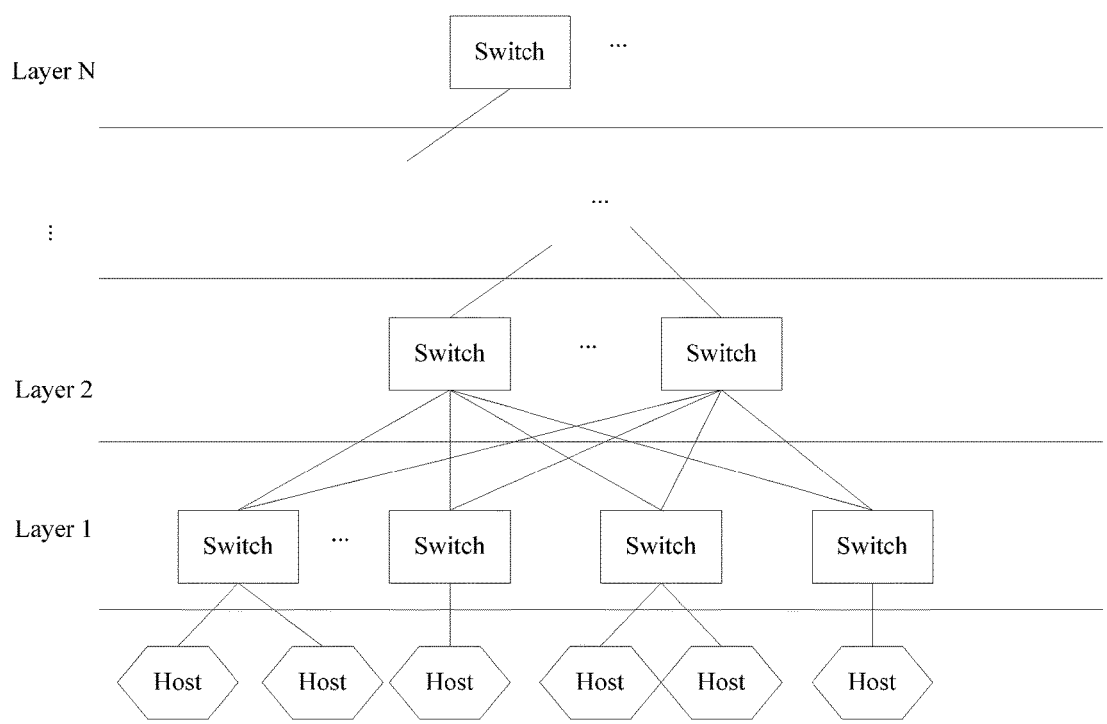
FIG. 7 illustrates a topology structure of switches on a network according to an embodiment of the present invention.

A switch topology structure on the network that is provided in this embodiment may be as shown in FIG. 7, while a switch topology structure on an existing network may be as shown in FIG. 6. As can be seen from the figures that, in the existing topology structure, switches on a network are not differentiated, while the topology stratification method provided in this embodiment can stratify switches on a network, that is, the switches on the network can be differentiated according to layers, so that a controller is capable of controlling a switch to purposefully forward a data packet, thereby efficiently restraining flooding, eliminating repeated broadcasting of the data packet on the network, and improving link utilization.

Figure 2:
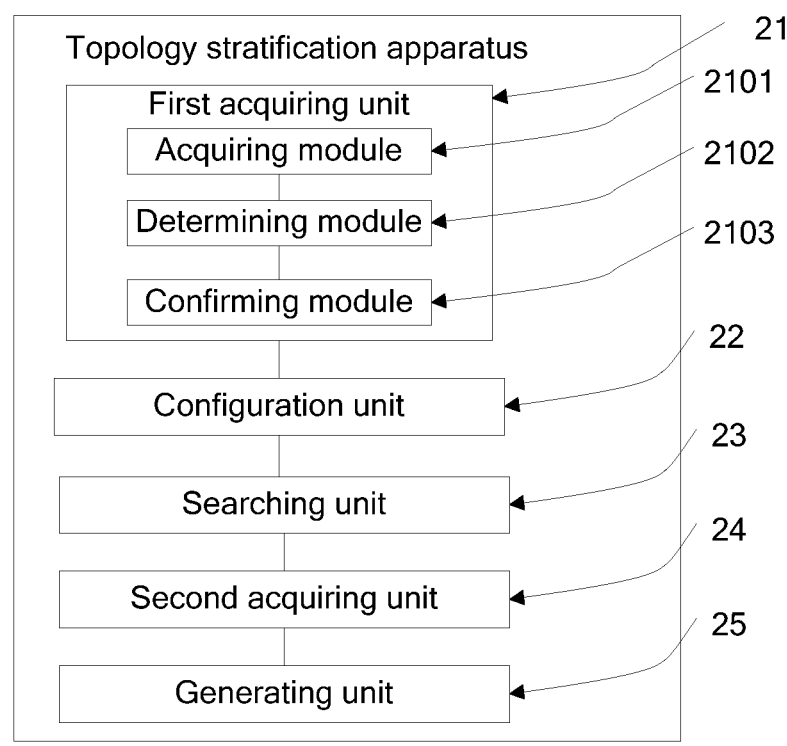
FIG. 2 is a schematic structural diagram of a topology stratification apparatus according to an embodiment of the present invention.

An embodiment provides a topology stratification apparatus. As shown in FIG. 2, an entity of the apparatus may be a controller, and the apparatus may include a first acquiring unit 21 and a configuration unit 22.

The first acquiring unit 21 may be adapted to acquire, according to topology information of a switch on a network, a switch connected to a host.

The first acquiring unit 21 may specifically include an acquiring module 2101, a determining module 2102, and a confirming module 2103.

The acquiring module 2101 may be adapted to acquire enabled ports of the switch according to the topology information of the switch on the network.

The determining module 2102 may be adapted to determine whether a port connected to the host exists among the enabled ports of the switch, where the enabled ports of the switch are acquired by the acquiring module 2101.

The confirming module 2103 may be adapted to, if the determining module 2102 determines that a port connected to the host exists among the enabled ports of the switch, confirm that the switch is the switch connected to the host.

The configuration unit 22 may be adapted to configure the switch connected to the host and acquired by the first acquiring unit 21 as a layer 1 switch.

The first acquiring unit 21 may be further adapted to acquire unstratified switches on the network.

The configuration unit 22 may be further adapted to configure a switch directly connected to a layer N switch among the unstratified switches that are acquired by the first acquiring unit 21 as a layer N+1 switch, where N indicates a layer on which the switch is located, and N is a positive integer.

Further, the apparatus may further include a searching unit 23, a second acquiring unit 24, and a generating unit 25.

The searching unit 23 may be adapted to, when a data packet that is reported by a switch connected to a source host is received, search a local MAC address table of physical addresses of devices to determine whether a destination address of the data packet exists.

The second acquiring unit 24 may be adapted to acquire a destination port if the searching unit 23 determines through searching that no destination address of the data packet exists, where the destination port is a port of a switch connected to a destination host, and the destination host is another host different from the source host.

The second acquiring unit 24 may be specifically adapted to acquire, according to topology stratification, a port among enabled ports of the switch connected to the destination host and use the port as the destination port, where the port is not connected to another switch.

The generating unit 25 may be adapted to use the destination port acquired by the second acquiring unit 24 as a destination address to generate a routing table, and send the routing table to the switch connected to the source host, so that the switch connected to the source host forwards the data packet according to the routing table.

It should be noted that, for other corresponding descriptions about each functional unit of the topology stratification apparatus provided in this embodiment, reference may be made to the corresponding description in FIG. 1. No further details are provided in this embodiment.

The topology stratification apparatus provided in this embodiment stratifies switches on a network, that is, the switches on the network can be differentiated according to layers, so that a controller is capable of controlling a switch to purposefully forward a data packet, thereby efficiently restraining flooding, eliminating repeated broadcasting of the data packet on the network, and improving link utilization.

Figure 3:
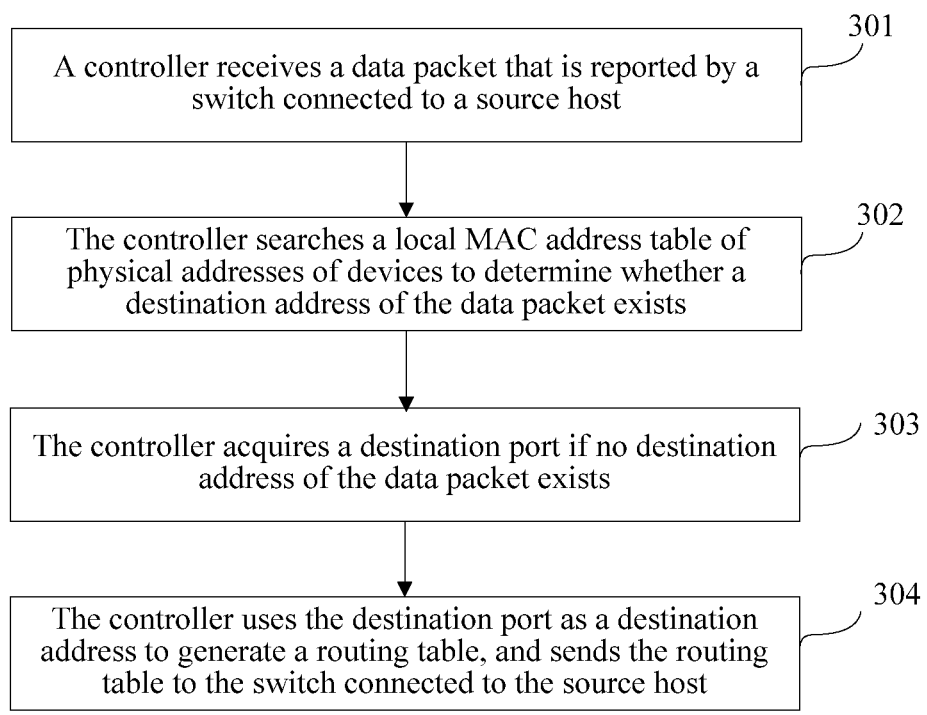
FIG. 3 is a flowchart of a flooding processing method according to an embodiment of the present invention.

An embodiment provides a flooding processing method. As shown in FIG. 3, the method includes the following steps.

301. A controller receives a data packet that is reported by a switch connected to a source host.

The data packet is an ARP request and/or an unknown unicast frame and/or DHCP data. A rule of switch classification in this embodiment is based on the topology stratification method provided in FIG. 1.

302. The controller searches a local MAC address table of physical addresses of devices to determine whether a destination address of the data packet exists.

Optionally, if the destination address of the data packet exists, the data packet is forwarded according to the destination address.

303. The controller acquires a destination port if no destination address of the data packet exists.

The destination port is a port of a switch connected to a destination host, the destination host is another host different from the source host, and there may be one or more destination hosts.

Specifically, the controller performs topology stratification on switches on a network, then acquires, according to the topology stratification, a port among enabled ports of the switch connected to the destination host, and uses the port as the destination port, where the port is not connected to another switch.

Optionally, when the data packet is an ARP request, before step 303, the method may further include the following. If a destination address of the ARP request exists in the local MAC address table, the controller directly responds to the ARP request sent by the source host. After step 303, the method may further include the following. A port to which a host is connected having unknown information is selected from the destination ports, and the port to which a host is connected having unknown information is used as the destination address. In this way, unicast data packets of ARP can be efficiently converged, and unnecessary data packets can be reduced on the network.

For example, first, host 1 pings (an executable command) host 9, and at this time, an ARP request sent by host 1 is unicast to host 4, host 6, and host 9 according to a decision of the controller; then host 1 pings host 6, and at this time, the ARP request sent by host 1 is unicast to host 4 and host 6 according to a decision of the controller; and subsequently, host 1 pings host 4, and at this time, the ARP request sent by host 1 is unicast only to host 4. In this way, unicast data packets of ARP can be efficiently converged, and unnecessary data packets can be reduced on the network. Afterward, the controller has known information about all hosts. Therefore, when a ping operation is performed again, the controller is capable of directly responding to the ARP request. Specifically, the controller may send a MAC address of a destination host to a host that initiates the request.

304. The controller uses the destination port as a destination address to generate a routing table, and sends the routing table to the switch connected to the source host.

Further, the switch connected to the source host is allowed to forward the data packet according to the routing table.

In the method provided in this embodiment, a controller performs topology stratification on locations of switches on a network, and configures a routing table for a switch when no destination address of a data packet reported by the switch can be found in a local MAC address table. In this way, the switch forwards the data packet only to a port of a switch connected to a destination host, thereby efficiently restraining flooding, eliminating repeated broadcasting of the data packet on the network, and improving link utilization.

Figure 4:
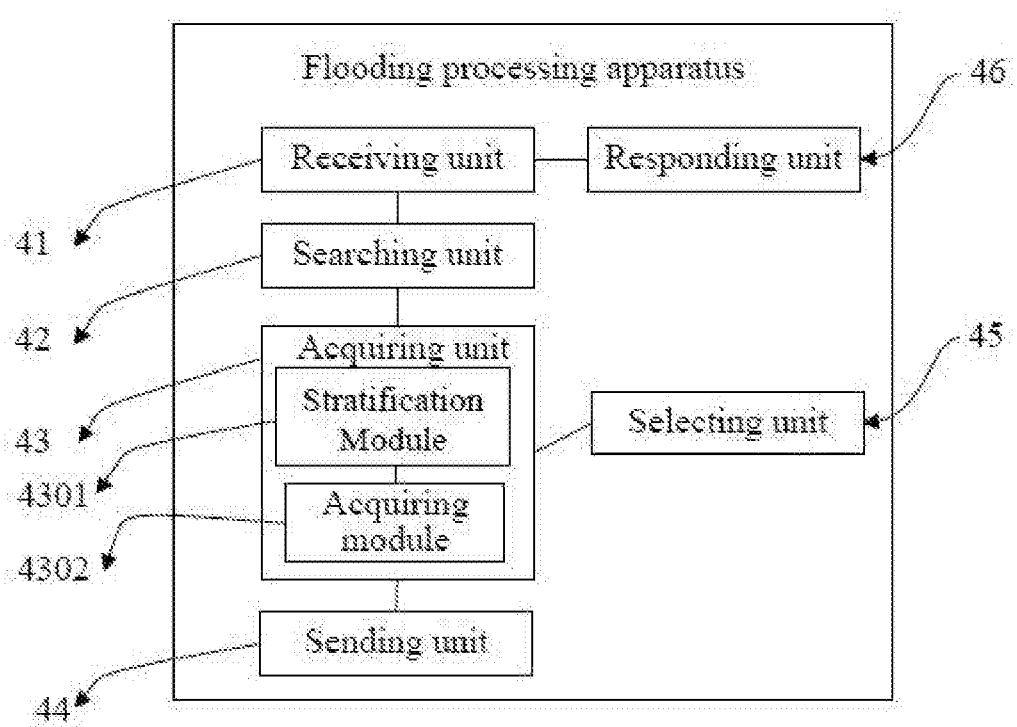
FIG. 4 is a schematic structural diagram of a flooding processing apparatus according to an embodiment of the present invention.

An embodiment provides a flooding processing apparatus. As shown in FIG. 4, the apparatus may include a receiving unit 41, a searching unit 42, an acquiring unit 43, and a sending unit 44.

The receiving unit 41 may be adapted to receive a data packet that is reported by a switch connected to a source host.

The data packet is an ARP request and/or an unknown unicast frame and/or DHCP data.

The searching unit 42 may be adapted to search a local MAC address table of physical addresses of devices to determine whether a destination address of the data packet received by the receiving unit 41 exists.

The acquiring unit 43 may be adapted to acquire a destination port if the searching unit 42 determines through searching that no destination address of the data packet exists in the MAC table.

The destination port is a port of a switch connected to a destination host, and the destination host is another host different from the source host.

The acquiring unit 43 may specifically include a stratification module 4301 and an acquiring module 4302.

The stratification module 4301 may be adapted to perform topology stratification on switches on a network.

The acquiring module 4302 may be adapted to acquire, according to the topology stratification performed by the stratification module, a port among enabled ports of the switch connected to the destination host and use the port as the destination port, where the port is not connected to another switch.

The sending unit 44 may be adapted to use the destination port acquired by the acquiring unit 43 as a destination address to generate a routing table, and send the routing table to the switch connected to the source host.

Further, the switch connected to the source host is allowed to forward the data packet according to the routing table.

The apparatus may further include a selecting unit 45 and a responding unit 46.

The selecting unit 45 may be adapted to select a port to which a host is connected having unknown information from the destination ports acquired by the acquiring unit 43 and use the port to which a host is connected having unknown information as the destination address.

The responding unit 46 is adapted to, if a destination address of the ARP request exists in the local MAC address table, directly respond to the ARP request that is sent by the source host and received by the receiving unit 41.

Figure 5:
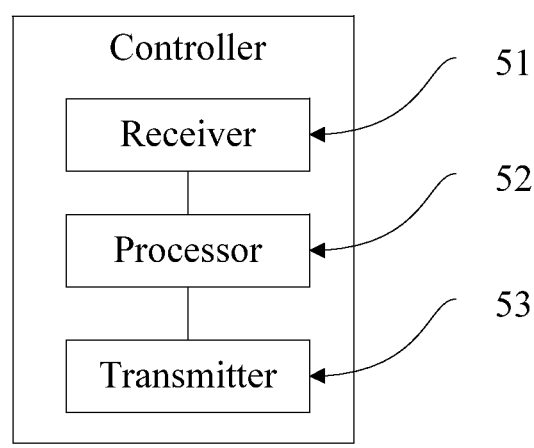
FIG. 5 is a schematic structural diagram of a controller according to an embodiment of the present invention.

An entity of the flooding processing apparatus provided in this embodiment may be a controller. The controller may be deployed on a server device but is not limited to this. As shown in FIG. 5, the controller includes a receiver 51, a processor 52, and a transmitter 53.

The receiver 51 may be adapted to receive a data packet that is reported by a switch connected to a source host.

The processor 52 may be adapted to search a local MAC address table of physical addresses of devices to determine whether a destination address of the data packet received by the receiver 51 exists.

The processor 52 may be further adapted to acquire a destination port if no destination address of the data packet exists in the MAC table, where the destination port is a port of a switch connected to a destination host, and the destination host is another host different from the source host.

The transmitter 53 may be adapted to use the destination port acquired by the processor 52 as a destination address to generate a routing table, and send the routing table to the switch connected to the source host, so that the switch connected to the source host forwards the data packet according to the routing table.

The processor 52 may be specifically adapted to perform topology stratification on switches on a network, then acquire, according to the topology stratification, a port among enabled ports of the switch connected to the destination host, and use the port as the destination port, where the port is not connected to another switch.

The processor 52 may be further adapted to select a port to which a host is connected having unknown information from the destination ports and use the port to which a host is connected having unknown information as the destination address.

The processor 52 may be further specifically adapted to: if a destination address of an ARP request exists in the local MAC address table, directly respond to the ARP request that is sent by the source host and received by the receiver 31.

It should be noted that, for other corresponding descriptions about each functional unit of the flooding processing apparatus and controller that are provided in this embodiment, reference may be made to the corresponding description in FIG. 3. No further details are provided in this embodiment.

According to the apparatus provided in this embodiment, a controller performs topology stratification on locations of switches on a network, and configures a routing table for a switch when no destination address of a data packet reported by the switch can be found in a local MAC address table. In this way, the switch forwards the data packet only to a port of a switch connected to a destination host, thereby efficiently restraining flooding, eliminating repeated broadcasting of the data packet on the network, and improving link utilization.

The topology stratification apparatus and the flooding processing apparatus that are provided in the embodiments of the present invention can implement the foregoing method embodiments. For specific function implementation, refer to the description in the method embodiments. No further details are provided herein. The topology stratification method and apparatus, and the flooding processing method and apparatus are applicable to, but not limited to, the field of communications systems.

A person of ordinary skill in the art may understand that all or a part of the processes of the methods in the embodiments may be implemented by a computer program instructing relevant hardware. The aforementioned program may be stored in a computer readable storage medium. When the program runs, the processes of the foregoing methods in the embodiments are performed. The storage medium may be a magnetic disk, an optical disk, a Read-Only Memory (ROM), a Random Access Memory (RAM), or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A flooding processing method, comprising:
   receiving, by a controller, a data packet from a source switch coupled to a source host;
   searching, by the controller, a local media access control (MAC) address table of physical addresses of devices to determine whether a destination address of the data packet exists;
   performing, by the controller, topology stratification on switches of a network when no destination address of the data packet exists;
   acquiring, by the controller according to the topology stratification, a destination port among enabled ports of a destination switch coupled to a destination host, wherein the destination port is not coupled to another switch, and wherein the destination host is different from the source host;
   using, by the controller, the destination port as a destination address to generate a routing table; and
   sending the routing table to the source switch.

2. The flooding processing method according to claim 1, wherein the data packet comprises at least one of an Address Resolution Protocol (ARP) request, an unknown unicast frame, and Dynamic Host Configuration Protocol (DHCP) data.

3. The flooding processing method according to claim 1, wherein the data packet is an Address Resolution Protocol (ARP) request, and wherein after acquiring the destination port, the method further comprises;
   selecting, by the controller, a selected port to which an unknown host is coupled, the unknown host having unknown information; and
   using the selected port to which the unknown host is coupled as the destination address.

4. The flooding processing method according to claim 1, wherein the data packet is an Address Resolution Protocol (ARP) request, and wherein before acquiring the destination port, the method further comprises directly responding, by the controller, to the ARP request received from the source host when the destination address of the ARP request exists in the local MAC address table.

5. A flooding processing apparatus, comprising:
   a receiver configured to receive a data packet from a source switch coupled to a source host;
   a transmitter; and
   a processor coupled to the receiver and the transmitter, wherein the processor is configured to:
   search a local media access control (MAC) address table of physical addresses of devices to determine whether a destination address of the data packet exists;
   perform topology stratification on switches on a network when no destination address of the data packet exists in the MAC table;
   acquire, according to the topology stratification, a destination port among enable ports of a destination switch coupled to a destination host, wherein the destination host is different from the source host, and wherein the destination port is not coupled to another switch; and
   use the destination port as a destination address to generate a routing table, and
   wherein the transmitter is configured to send the routing table to the source switch.

6. The flooding processing apparatus according to claim 5, wherein the data packet comprises at least one of an Address Resolution Protocol (ARP) request, an unknown unicast frame, and Dynamic Host Configuration Protocol (DHCP) data.

7. The flooding processing apparatus according to claim 5, wherein the data packet is an Address Resolution Protocol (ARP) request, and wherein the processor is further configured to:
   select a selected port to which an unknown host is coupled having unknown information; and
   use the selected port to which the unknown host is coupled as the destination address.

8. The flooding processing apparatus according to claim 5, wherein the data packet is an Address Resolution Protocol (ARP) request, and wherein the processor is further configured to directly respond to the ARP request that is received from the source host when the destination address of the ARP request exists in the local MAC address table.

* * * * *